(12) United States Patent
Andreas-Schott

(10) Patent No.: US 7,807,309 B2
(45) Date of Patent: Oct. 5, 2010

(54) INTEGRATED COOLANT HEADER VENTING FOR A FUEL CELL STACK

(75) Inventor: Benno Andreas-Schott, Pittsford, NY (US)

(73) Assignee: GM Global Technology Operations, Inc., Detroit, MI (US)

( * ) Notice: Subject to any disclaimer, the term of this patent is extended or adjusted under 35 U.S.C. 154(b) by 1440 days.

(21) Appl. No.: 11/212,857

(22) Filed: Aug. 26, 2005

(65) Prior Publication Data

US 2006/0051650 A1    Mar. 9, 2006

Related U.S. Application Data

(60) Provisional application No. 60/606,962, filed on Sep. 3, 2004.

(51) Int. Cl.
*H01M 8/00* (2006.01)
*H01M 8/04* (2006.01)

(52) U.S. Cl. .................. 429/452; 429/458; 429/512

(58) Field of Classification Search .............. 429/12, 429/26, 34
See application file for complete search history.

(56) References Cited

U.S. PATENT DOCUMENTS

2005/0037935 A1 * 2/2005 Abd Elhamid et al. ...... 510/175
2005/0175873 A1 * 8/2005 Edwards et al. ............... 429/26

* cited by examiner

*Primary Examiner*—Patrick Ryan
*Assistant Examiner*—Karie O'Neill Apicella
(74) *Attorney, Agent, or Firm*—Harness, Dickey & Pierce, P.L.C.

(57) ABSTRACT

A fuel cell stack configuration and method of removing gas from the coolant flow path within a fuel cell stack is provided. The fuel cell stack has an internal vent passageway that communicates with the coolant supply header to enable gas entrapped therein to be vented from the fuel cell stack. The vent passageway can be formed by a plurality of apertures in the components that comprise the fuel cell stack and run parallel and adjacent to the coolant supply header. Alternatively, a vent line can be connected to the coolant supply header with a valve therein to selectively vent gas from the coolant supply header.

19 Claims, 5 Drawing Sheets

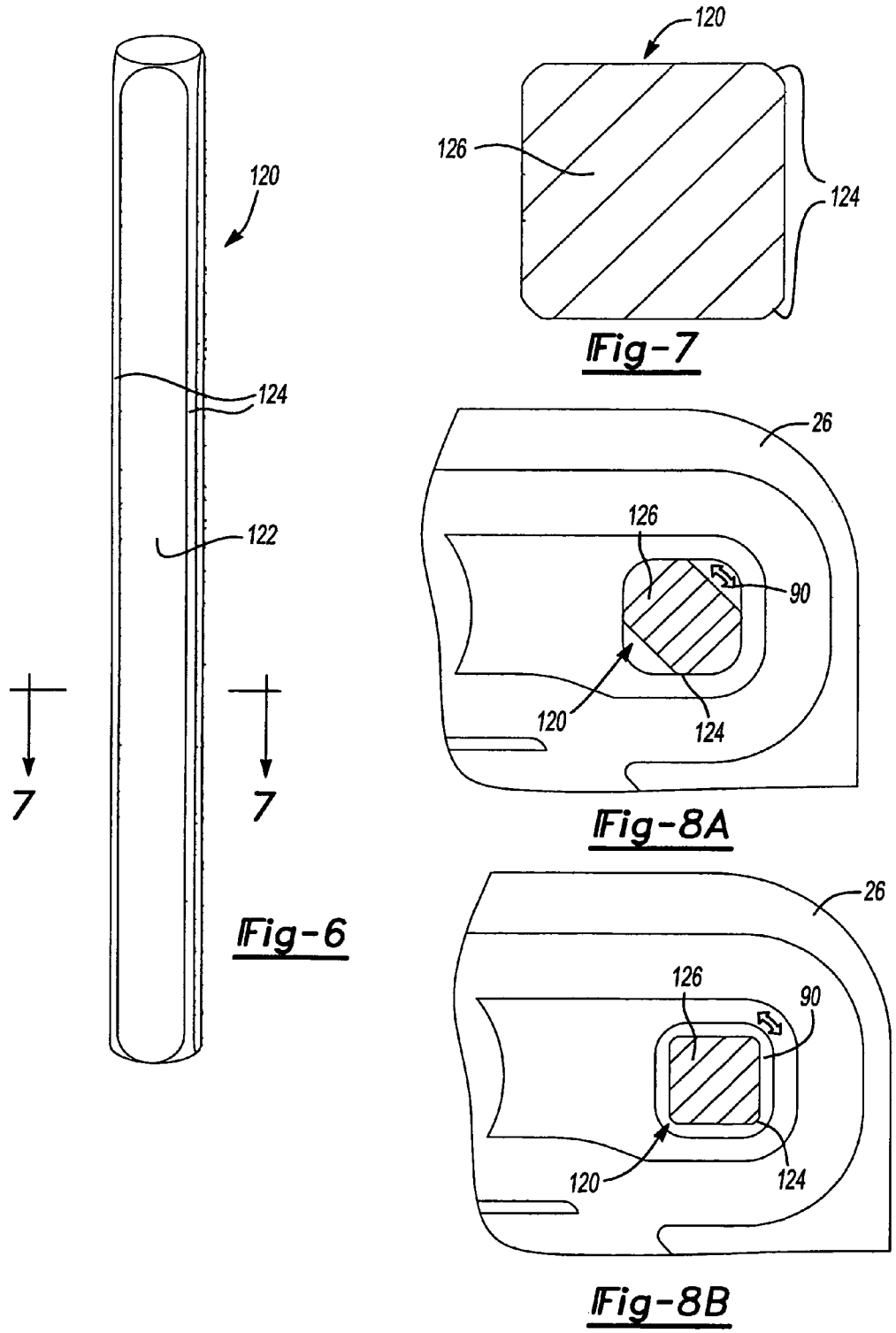

INTEGRATED COOLANT HEADER VENTING FOR A FUEL CELL STACK

CROSS-REFERENCE TO RELATED APPLICATIONS

This application claims the benefit of U.S. Provisional Application No. 60/606,962, filed on Sep. 3, 2004. The disclosure of the above application is incorporated herein by reference.

FIELD OF THE INVENTION

The present invention relates to fuel cell stacks and, more particularly to venting of a coolant header of a fuel cell stack.

BACKGROUND OF THE INVENTION

Fuel cells are used or have been proposed as a power source in many applications, such as in electrical vehicular power plants to replace internal combustion engines and in stationary applications to produce electrical power. In proton exchange membrane (PEM) type fuel cells, hydrogen is supplied to the anode of the fuel cell and oxygen is supplied to the cathode. PEM fuel cells include a membrane electrode assembly (MEA) comprising a thin, proton transmissive, non-electrically conductive solid polymer electrolyte membrane having the anode catalyst on one of its faces and the cathode catalyst on the opposite face. The MEA is sandwiched between a pair of electrically conductive elements which serve as current collectors for the anode and cathode, and contain appropriate channels and/or openings therein for distributing the fuel cells' gaseous reactants over the surfaces of the respective anode and cathode catalysts. A typical PEM fuel cell and its MEA are described in U.S. Pat. Nos. 5,272,017 and 5,316,871 issued respectively Dec. 21, 1993 and May 31, 1994 and assigned to General Motors Corporation.

The term "fuel cell" is typically used to refer to either a single cell or a plurality of cells depending on the context. A plurality of individual cells are commonly bundled together to form a fuel cell stack. Each cell within the fuel cell stack comprises the MEA described earlier, and each MEA provides its increment of voltage.

During the operation of the fuel cell stack, heat is generated that needs to be removed. To remove the heat, the fuel cell stack includes a coolant flow path that allows a coolant flow to pass through the fuel cell stack and extract heat therefrom. During the flow of coolant through the fuel cell stack, however, gas, such as air, can become entrapped within the coolant flow path in the fuel cell stack. The entrapped gas may prevent the coolant from flowing through the entire coolant flow path and possibly cause some components to overheat or operate at an undesirable elevated temperature. Accordingly, it would be desirable to remove gas from the coolant flow path. Furthermore, it would be advantageous if the removal of gas from coolant flow path is achieved with a minimal addition or change to the fuel cell stack.

SUMMARY OF THE INVENTION

The present invention provides a fuel stack configuration for and a method of removing gas from the coolant flow path within the fuel cell stack. A fuel cell stack, according to the principles of the present invention, includes a plurality of fuel cells arranged in a stacked configuration. There is an internal coolant flow path through the fuel cells through which a coolant flows. A coolant vent passageway communicates with the internal coolant flow path and allows gas within the internal coolant flow path to be removed therefrom.

A fuel cell system according to the principles of the present invention includes a fuel cell stack and a coolant flow path therethrough. There is a coolant system that communicates with the coolant flow path and is operable to supply a coolant flow to the coolant flow path and to receive the coolant flow from the coolant flow path after passing through the fuel cell stack. The coolant system includes a vent line communicating with the coolant flow path which is operable to remove gas from the coolant flow path.

In another aspect of the present invention, a method of operating a fuel cell system is disclosed. The method includes: 1) supplying a coolant flow to a coolant supply header with a coolant system; 2) routing the coolant flow from the coolant supply header through fuel; cell stack and into a coolant return header; 3) returning the coolant flow from the coolant return header to the coolant system; 4) routing gas in the coolant supply header to a coolant vent passageway; and 5) venting the gas from the coolant vent passageway to a reservoir through a coolant vent line communicating with the coolant vent passageway and the reservoir.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 6 is a perspective view of an alignment member that can be used to align the components of a fuel cell stack;

FIG. 7 is a cross-sectional view of the alignment member of FIG. 6 taken along line 7-7; and FIGS. 8A and B are plan views of the alignment member, in cross-section, in an engaged and disengaged position with an alignment feature on the fuel cell plate of FIG. 4.

DETAILED DESCRIPTION OF THE PREFERRED EMBODIMENT

The following description of the preferred embodiment is merely exemplary in nature and is in no way intended to limit the invention, its application, or uses.

Figure 1:
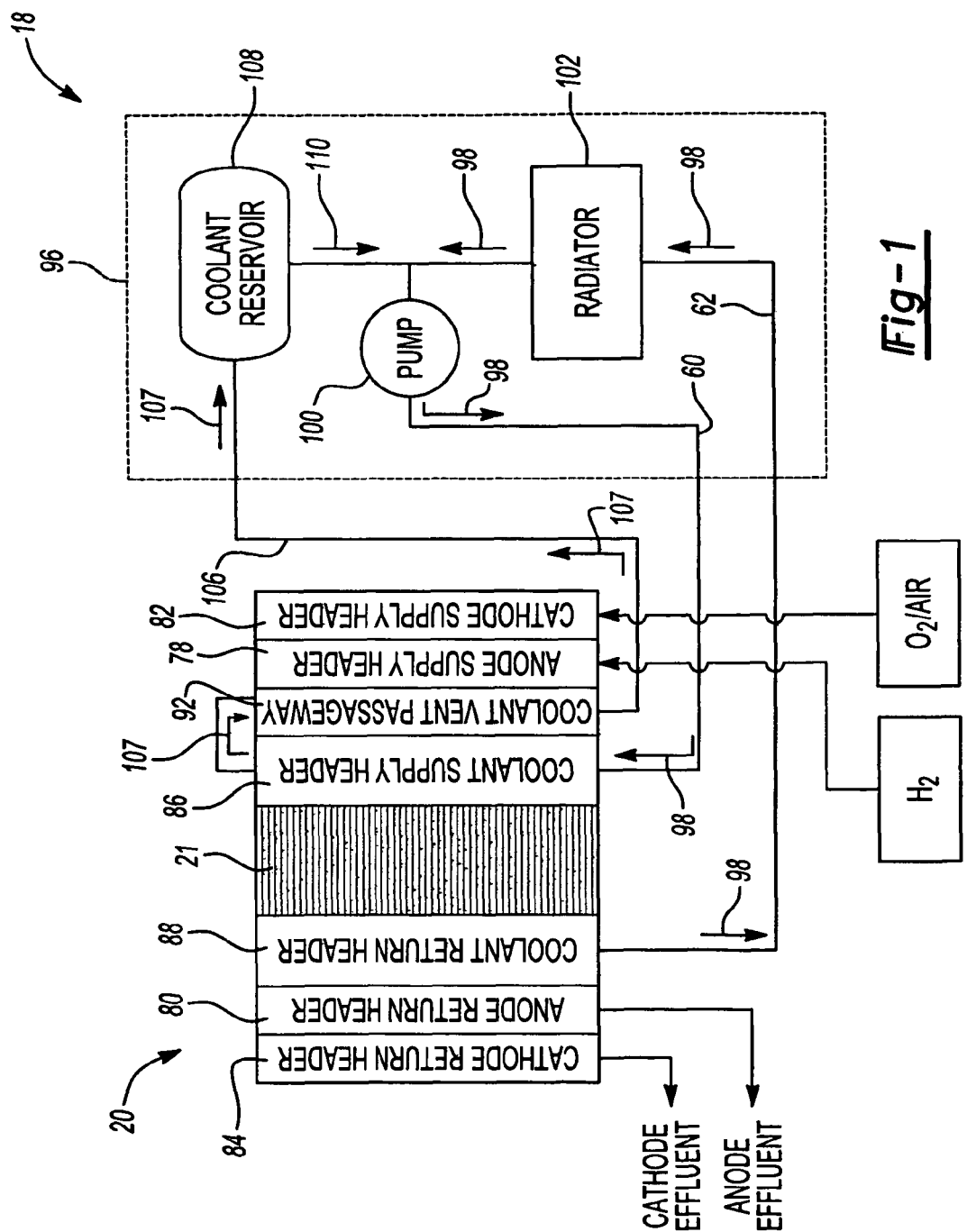
FIG. 1 is a schematic representation of a preferred embodiment of a fuel cell system according to the principles of the present invention.
Figure 2:
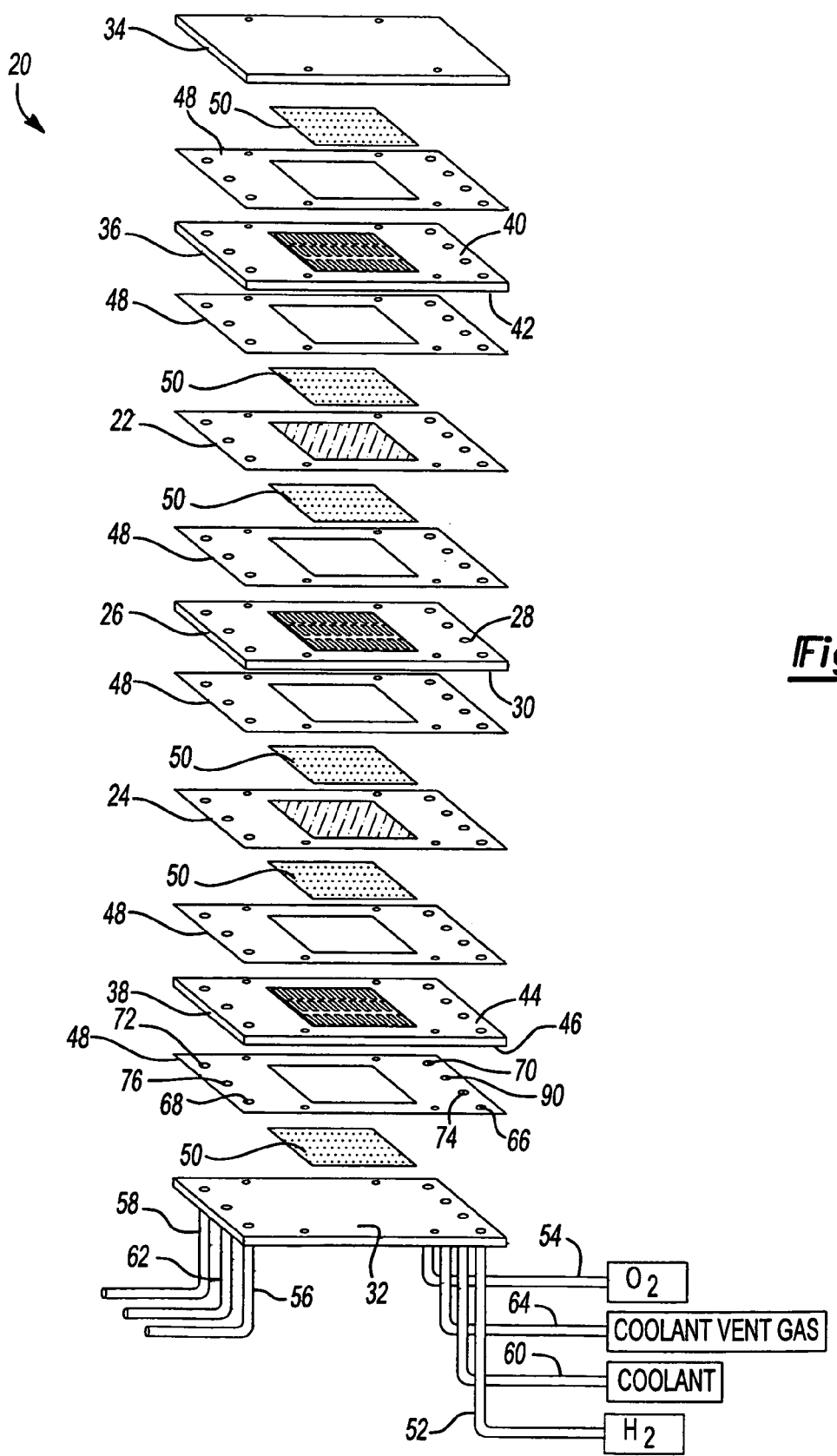
FIG. 2 is a simplified exploded perspective view of an exemplary fuel cell stack according to the principles of the present invention that can be used in the fuel cell system of FIG. 1.

Referring to FIG. 1, a schematic representation of a fuel cell system 18 according to the preferred embodiment in the present invention is shown. Fuel cell system 18 includes a fuel cell stack 20 having a plurality of fuel cells 21 arranged relative to one another in a stacked configuration. To gain a better understanding of the present invention, an exploded view of an exemplary fuel cell stack 20 that can be used with the present invention is shown in FIG. 2. FIG. 2 depicts two individual PEM fuel cells connected to form a stack 20 having a pair of MEAs 22, 24 separated from each other by an electrically conductive, liquid-cooled, bipolar separator plate conductive element 26. The MEAs form the active area of each fuel cell. An individual fuel cell, which is not connected in series within a stack, has a separator plate 26 with a single electrically active side. In a stack, a preferred bipolar separator plate 26 typically has two electrically active sides 28, 30 within the stack, each active side 28, 30 respectively facing a separate MEA 22, 24 with opposite charges that are separated, hence the so-called "bipolar" plate.

The MEAs 22, 24 and bipolar plate 26 are stacked together between stainless steel clamping terminal plates 32, 34 and end contact fluid distribution elements 36, 38. The end fluid distribution elements 36, 38, as well as both working faces or sides 28, 30 of the bipolar plate 26, contain a plurality of lands adjacent to grooves or channels on the active faces 42, 28, 30 and 44 and form flow fields for distributing anode and cathode reactants (i.e., $H_2$ and $O_2$/air) to the MEAs 22, 24. Faces 40 and 46 of the respective end fluid distribution elements 36, 38 also contain a plurality of lands adjacent to grooves or channels but are non-active and do not have fluids flowing therethrough. Nonconductive gaskets or seals 48 provide seals and electrical insulation between the several components of the fuel cell stack. Gas-permeable conductive diffusion media 50 press up against the electrode faces of the MEAs 22, 24 and are placed between the end contact fluid distribution elements 36, 38 and the terminal collector plates 32, 34 to provide a conductive pathway therebetween. Alternatively, unitized MEAs (not shown) having the MEA, diffusion media layers, and sealing members bundled together as a single component can be used.

Anode reactant in the form of $H_2$ is supplied to the anode flow fields of fuel cell stack 20 from a storage tank, a methanol or gasoline reformer, or the like, via appropriate supply plumbing 52. Similarly, cathode reactant in the form of $O_2$/air is supplied to the cathode flow fields of the fuel cell stack 20 from a storage tank or from the ambient via appropriate supply plumbing 54. Exhaust plumbing 56, 58 for the anode and cathode effluents produced in the respective anode and cathode flow fields of fuel cell stack 20 are also provided. Additional supply plumbing 60 is provided for circulating coolant through bipolar plates 26 and end plates 36, 38 and out the exit plumbing 62. Coolant vent plumbing 64 is also provided to remove or vent gas from the coolant flowing through fuel cell stack 20. Supply and exit or exhaust plumbing 52, 54, 56, 58, 60, and 62 communicate with headers within fuel cell stack 20.

The various components of fuel cell stack 20 have apertures 66, 68, 70, 72, 74 and 76 that align to form portions of supply and return fluid headers 78, 80, 82, 84, 86, 88 (FIG. 1) for the reactant and coolant flows. Additionally, apertures 90 in the various components align to form a portion of a coolant vent passageway 92 (FIG. 1) in fuel cell stack 20. The apertures may be included on the following components: MEAs 22 and 24, sealing members 48, bipolar plate 26, end fluid distribution elements 36 and 38, and terminal plates 32 and 34. Apertures 66, 68 are in fluid communication with anode reactant plumbing 52, 56. Apertures 70, 72 are in fluid communication with cathode reactant plumbing 54, 58. Similarly, apertures 74, 76 are in fluid communication with coolant plumbing 60, 62 while apertures 90 are in fluid communication with coolant vent plumbing 64. Optionally, apertures 66, 68, 70, 72, 74, 76, and 90 may also serve as internal alignment features of the components of fuel cell stack 20, as described in more detail below.

Referring to FIG. 1, fuel cell system 18 also includes a coolant system 96. Coolant system 96 is operable to circulate a coolant flow 98 through fuel cell stack 20 to remove heat therefrom. Coolant supply header 86, the coolant flow fields within fuel cells 21 and coolant return header 88 form a coolant flow path within fuel cell stack 20 that enables heat to be removed from fuel cell stack 20 via coolant flow 98. Coolant system 96 includes a pump 100 that communicates with coolant supply header 86 via coolant supply plumbing 60. Pump 100 is operable to cause coolant flow 98 to flow through the coolant flow path within fuel cell stack 20 to remove heat therefrom. The coolant that flows through the fuel cells exits coolant return header 88 into coolant return plumbing 62. The coolant within coolant return plumbing 62 is routed to a radiator 102 wherein heat is removed from the coolant flowing therethrough. The outlet of radiator 102 communicates with the inlet of pump 100 to allow the coolant to be recirculated back into fuel cell stack 20.

To remove air that may become entrapped within the coolant flow path, fuel cell stack 20 has a coolant vent passageway 92. Coolant vent passageway 92 communicates with coolant supply header 86 to allow entrapped gas to be removed therefrom. Preferably, coolant vent passageway 92 communicates with a nominally high spot within coolant supply header 86. As used herein, a nominally high spot is a spot that is normally the highest vertical position. The actual high spot at any given time may change, such as when the fuel cell stack is in a vehicle on a hill. The communication with the nominally high spot enables gas, which will be located at the high spot within coolant supply header 86, to be more thoroughly removed from coolant supply header 86. Coolant vent passageway 92 communicates with a coolant vent line 106 of coolant system 96. A coolant vent flow 107 will flow from coolant supply header 86 into coolant vent passageway 92. Vent flow 107 includes gas from coolant supply header 86 along with a portion of coolant flow 98. Vent flow 107 is directed from coolant vent passageway 92 into a coolant reservoir 108 via vent line 106. Within reservoir 108, the gas and liquid coolant are separated from one another and the liquid coolant portion 110 flows into the inlet of pump 100 to form a portion of coolant flow 98.

Vent flow 107 is induced by a pressure differential between the pressure within coolant supply header 86 and coolant reservoir 108. Pump 100, when operating to cause coolant flow 98 to enter the coolant flow path within fuel cell stack 20, causes the pressure within coolant supply header 86 to increase. The drawing of liquid portion 110 from reservoir 108 reduces the pressure within reservoir 108. As a result, a pressure differential between coolant supply header 86 and reservoir 108 exists. This pressure differential causes vent flow 107 to enter coolant vent passageway 92 and flow onward into reservoir 108.

To facilitate the venting of gas from the coolant flow path within fuel cell stack 20, coolant vent passageway 92 is preferably sized so that the velocity of vent flow 107 is sufficient to entrap the gas within the liquid coolant portion of vent flow 107 and withdraw the gas from coolant supply header 86 into coolant vent passageway 92 and onward to reservoir 108.

Figure 3:
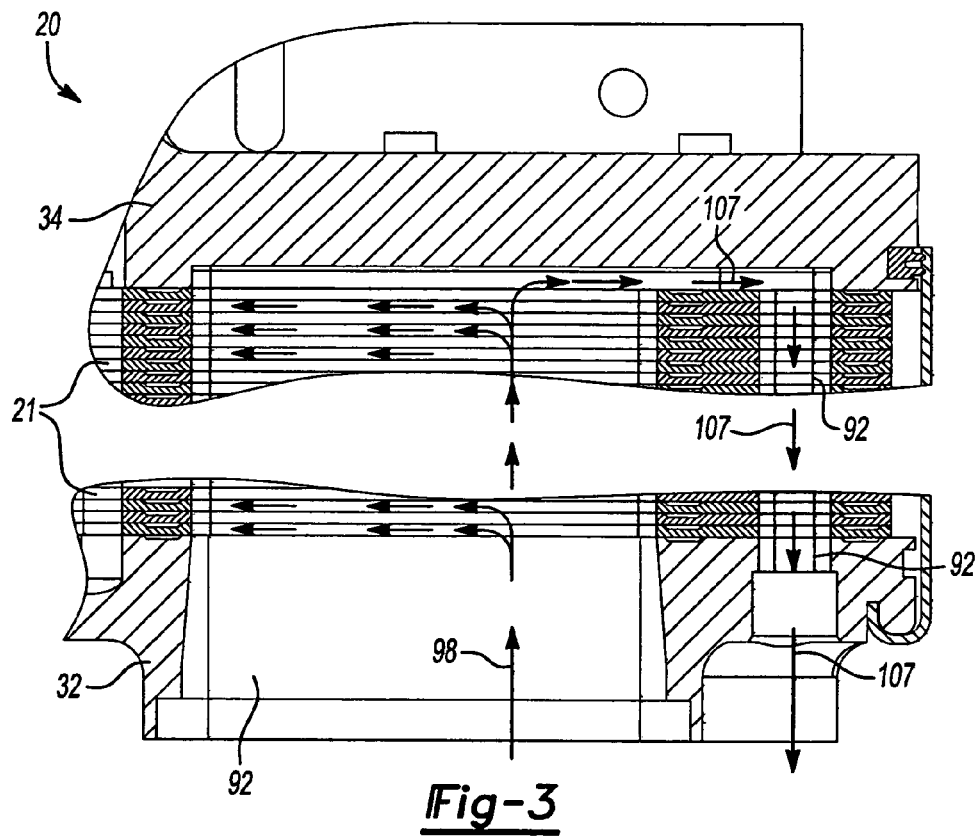
FIG. 3 is a simplified fragmented cross-sectional view of the fuel cell stack of FIG. 1, showing the coolant supply header and the coolant vent passageway according to the principles of the present invention.
Figure 4:
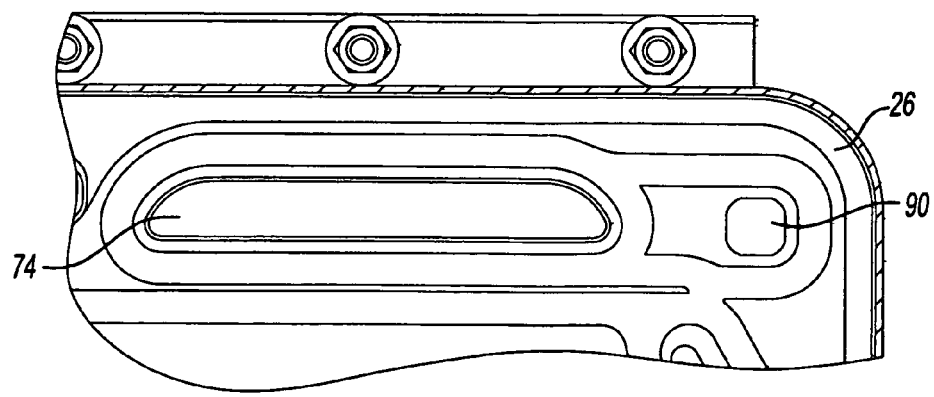
FIG. 4 is a fragmented plan view of a fuel cell plate used in the fuel cell stack of FIG. 3 showing the coolant supply header aperture and the coolant vent passageway aperture.

Referring now to FIGS. 3 and 4, details of coolant supply header 86 and coolant vent passageway 92 are shown. As shown in FIG. 2, a portion of coolant supply header 86 is formed by the aligned apertures 74 of the components that comprise fuel cell stack 20 while a portion of coolant vent passageway 92 is formed by the alignment apertures 90 of the components that comprise fuel cell stack 20. For example, in FIG. 4, a portion of bipolar plate 26 used to form fuel cells 21 within fuel cell stack 20 is shown. As can be seen, the apertures 74 that align to form a portion of coolant supply header 86 are positioned adjacent the apertures 90 that form a portion of coolant vent passageway 92. A sealing member 48 (FIG. 2) prevents direct flow between the coolant flowing within aperture 74 into aperture 90. On the uppermost fuel cell within fuel cell stack 20, however, the sealing member 48 enables a passageway to exist between coolant supply header 86 and coolant vent passageway 92, as shown in FIG. 3. This passageway enables a portion of the liquid coolant within coolant flow 98 and entrapped gas within coolant supply header 86 to form vent flow 107 and flow into coolant vent passageway 92, as shown FIG. 3. Once within coolant vent passageway 92, vent flow 107 travels down through coolant vent passageway 92 out of fuel cell stack 20 and into reservoir 108. The passageway interconnecting coolant supply header 86 and coolant vent passageway 92, as shown in FIG. 3, occurs at the nominally high point or spot of coolant supply header 86, thus facilitating the thorough removal of gasses from coolant supply header 86.

As shown in FIG. 1-3, fuel cell stack 20 preferably has all fluids flowing in and out of a single end of the stack. The end having the fluids flowing through is referred to as the "wet" end, while the opposite end of fuel cell stack, the end having no fluids flowing therethrough, is referred to as the "dry" end. Typically, as shown in FIGS. 2 and 3, the wet end is positioned as the nominally lower end of fuel cell stack 20, while the dry end is the upper end. By having the wet end down, it is easier to purge water that forms within the cathode and/or anode flow paths within fuel cell stack 20. Further, the separating of the dry and wet end allows for the electronics and electrical connections that are used to control and operate fuel cell stack 20 and/or fuel cell system 18 to be conveniently packaged adjacent one another on one end of fuel cell stack 20.

Figure 5:
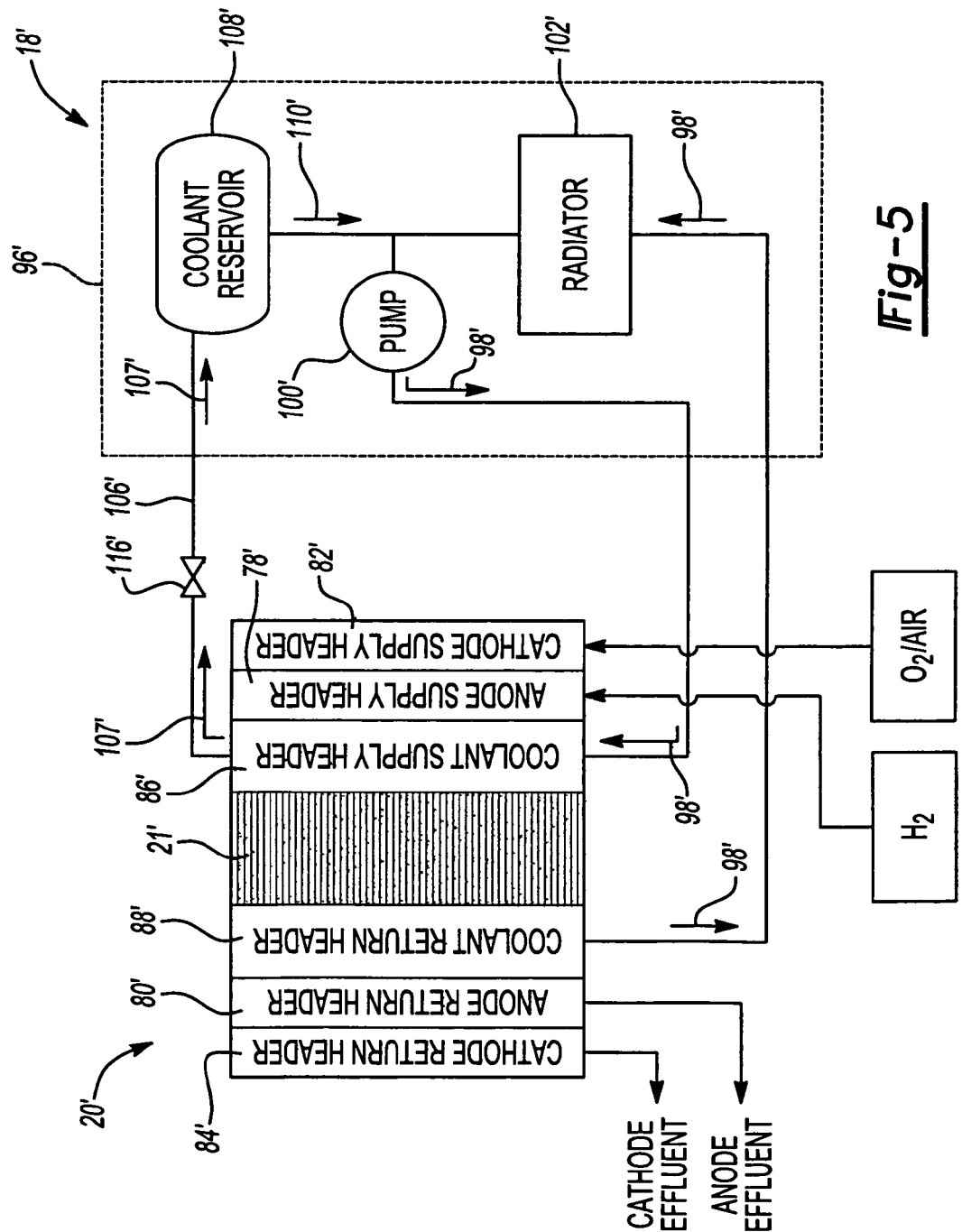
FIG. 5 is a simplified schematic representation of an alternate embodiment of a fuel cell system according to the principles of the present invention.

Referring now to FIG. 5, an alternate embodiment of fuel cell system 18' is shown. In fuel cell system 18', fuel cell stack 20' does not include a coolant vent passageway that extends adjacent the supply headers. Rather, in this embodiment the coolant vent passageway (not shown) extends from a nominal high point of the coolant supply header 86' to an exterior of the fuel cell stack 20'. It should be appreciated that the coolant vent passageway can be as simple as an aperture or bore extending through a sidewall or end plate of fuel cell stack 20' and/or through other components. It should also be appreciated that the coolant vent passageway extends in either a nominally upward or horizontal direction. Vent line 106' is connected to the coolant vent passageway. A valve 116' is located in vent line 106'. Valve 116' is selectively operable between open and closed positions to selectively allow vent flow 107' to be vented into reservoir 108'. That is, while pump 100' is operating to cause coolant flow 98' to flow through the coolant flow path within fuel cell stack 20', valve 116' can be selectively opened to allow for pressure differential between reservoir 108' and coolant supply header 86' to cause vent flow 107' to flow through vent line 106' into reservoir 108'. With this embodiment, it is not necessary for vent flow 107' to include a liquid portion of coolant flow 98'. That is, the liquid is not necessary to entrap the gas, in the form of bubbles within a liquid flow, to be removed from the fuel cell stack 20'. Rather, reservoir 108' is located at an elevation nominally above the nominally high spot of coolant supply header 86' and, thus, enables flow of gas from coolant supply header 86' to flow into reservoir 108' without requiring the use of a liquid flow to accompany the gas. In this embodiment, vent line 106' extends through either the dry end of fuel cell stack 20' or the side of fuel cell stack 20' adjacent the dry end so that it communicates with the nominally high spot within coolant supply header 86'.

Optionally, as stated above, the apertures used to form portions of the supply and return headers for the reactants and coolants and apertures 90 used to form a portion of coolant vent passageway 92 can be used as alignment features to align the various components of fuel cell stack 20 during assembly. To accomplish this, two or more apertures are also configured to function as alignment features and engage with an alignment pin during assembly to cause the components to align in a specific orientation relative to one another. Referring to FIGS. 6 and 7, an exemplary alignment pin 120 that can be used to align the components of fuel cell stack 20 during assembly is illustrated. Alignment pin 120 includes an exterior surface 122 with portions 124 designed to selectively engage with the internal alignment features, such as the apertures when so designed, of fuel cell stack 20. Alignment pin 120 can take a variety of shapes. For example, as illustrated in FIG. 7, alignment pin 120 can have a substantially square cross section 126 with engaging portions 124 formed by rounded corners. Alternatively, alignment pin 120 can have a cross-sectional shape that is substantially triangular (not shown), octagonal (not shown), and the like. Furthermore, engaging portions 124 can have a radius of curvature that is larger or smaller than that shown.

Referring now to FIG. 8, a portion of bipolar plate 26 having coolant vent aperture 90 configured to also function as an alignment feature is shown interacting with alignment pin 120. FIG. 8A shows a portion of plate 26 disposed around and engaged with alignment pin 120. Engagement portions 124 are engaged with the sides of aperture 90. FIG. 8B shows alignment pin 120 disengaged from the sides of aperture 90. Alignment pin 120 has been rotated along its longitudinal axis to move from the engaged position, shown in FIG. 8A, to the disengaged position, shown in FIG. 8B. When alignment pin 120 is in the engaged position, all of the components are aligned to a specific orientation relative to alignment pin 120 and, thus, relative to each other. When alignment pin 120 is in a disengaged position, the components of fuel cell stacks are not forced into a specific orientation relative to one another. Thus, alignment pin 120 can be rotated along its longitudinal axis to move from an engaged position to a disengaged position.

During assembly, two or more alignment pins 120 are utilized to align the various components of fuel cell stack 20. The alignment pins 120 can be positioned in an engaged position and the components of fuel cell stack 20 positioned on and slid along the length of the alignment pin 120 until they are in contact with the preceding components. As each component is added to fuel cell stack 20, the components are aligned in a specific orientation relative to the preceding components and to components later added because alignment pins 120 are in the engaged position. Once the components have been added, alignment pins 120 can be rotated to the disengaged position and removed from the stack. Alternatively, alignment pins 120 can be in a disengaged position while one or more components of fuel cell stack 20 are positioned thereon. Alignment pins 120 would then be rotated, as needed, to the engaged position forcing the components that have been positioned thereon to be moved into a specific orientation relative to one another and thereby aligned. Once aligned, alignment pins 120 can be rotated to the disengaged position again and more components added to the stack. This process would then continue until all the components have been added and aligned. Once aligned, alignment pins 120 can be removed therefrom.

Thus, the various components of fuel cell stack 20 can include apertures 90 that align with one another to form a coolant vent passageway 92 to allow gas to be vented from the coolant flow path within fuel cell stack 20. These same apertures 90 can also be configured to function as alignment features to facilitate the alignment of the various components into a specific orientation relative to one another during the assembly of fuel cell stack 20.

It is to be understood that the description of the invention is merely exemplary in nature and, thus, variations do not depart from the gist of the invention are intended to be within the scope of the invention. For example, while coolant vent passageway 92 is shown as being adjacent coolant supply header 86, other headers, such as the anode reactant header or cathode reactant header, can be disposed between the coolant supply header and the coolant vent passageway. Furthermore, while coolant vent passageway 92 has been shown as preferably extending through the wet end of the fuel cell stack, coolant vent passageway 92 could also extend out the side of the fuel cell stack. Thus, variations may occur in the configuration of the components of fuel cell stack 20 and fuel cell system 18 while still being within the scope of the present invention. Such variations are not to be regarded as a departure from the spirit and scope of the invention.

What is claimed is:

1. A fuel cell system comprising:
   a fuel cell stack having a plurality of fuel cells arranged in a stacked configuration, an internal coolant flow path through said fuel cells, and an internal coolant vent passageway separate and distinct from said internal coolant flow path, said internal coolant vent passageway communicating with said internal coolant flow path; and
   a coolant system communicating with said internal coolant flow path and supplying a coolant flow to said internal coolant flow path and receiving said coolant flow from said internal coolant flow path after passing through said fuel cell stack, said coolant system including a vent line communicating with said internal coolant vent passageway and with said internal coolant flow path through said internal coolant vent passageway,
   wherein
      said internal coolant vent passageway allows gas within said internal coolant flow path to be removed therefrom, exit said fuel cell stack, and flow into said vent line.

2. The fuel cell system of claim 1, wherein said internal coolant flow path includes a coolant supply header that receives said coolant flow and a coolant outlet header that exhausts at least a portion of said coolant flow from the fuel cell stack, and said internal coolant vent passageway communicates with said coolant supply header and allows gas within said coolant supply header to be removed therefrom.

3. The fuel cell system of claim 2, wherein said fuel cells include a plurality of plates with flow fields thereon, a portion of said coolant supply header is formed by a plurality of aligned first apertures in said plates and extending perpendicularly to said flow fields, and a portion of said internal coolant vent passageway is formed by a plurality of aligned second apertures in said plates and extending perpendicularly to said flow fields.

4. The fuel cell system of claim 3, wherein said first and second apertures are immediately adjacent one another.

5. The fuel cell system of claim 3, wherein said second apertures in said plates are alignment features that align said plates relative to one another.

6. The fuel cell system of claim 3, wherein a portion of said coolant outlet header is formed by a plurality of aligned third apertures in said plates and extending perpendicularly to said flow fields.

7. The fuel cell system of claim 1, wherein said internal coolant vent passageway communicates with a nominal high point of said internal coolant flow path.

8. The fuel cell system of claim 1, wherein said fuel cell stack further includes first and second end plates separate and distinct from said fuel cells and between which said fuel cells are disposed and wherein said internal coolant flow path and said internal coolant vent passageway pass through a same one of said end plates and allow communication therewith only through said same one of said end plates.

9. The fuel cell system of claim 1, wherein said fuel cell stack further includes first and second end plates separate and distinct from said fuel cells and between which said fuel cells are disposed and wherein said internal coolant flow path and said internal coolant vent passageway pass through different ones of said end plates and allow direct communication therewith only through said different ones of said end plates.

10. A fuel cell system comprising:
    a fuel cell stack having an internal coolant flow path therethrough; and
    a coolant system communicating with said coolant flow path and operable to supply a coolant flow to said internal coolant flow path and receive said coolant flow from said internal coolant flow path after passing through said fuel cell stack, said coolant system including a vent line communicating with said internal coolant flow path and operable to remove gas from said internal coolant flow path,
    wherein said coolant system further includes a coolant supply line and a coolant return line and said fuel cell stack includes:
      a plurality of plates with a flow field thereon arranged in a stacked configuration, each of said plates having a plurality of apertures therethrough and extending perpendicularly to said flow fields;
      a coolant supply header forming a portion of said internal coolant flow path, a portion of said coolant supply header formed by a plurality of aligned first ones of said apertures, said coolant supply header communicating with said coolant supply line and receiving said coolant flow from said coolant system; and
      an internal coolant vent passageway, a portion of said internal coolant vent passageway formed by a plurality of aligned second ones of said apertures different than said first ones, said internal coolant vent passageway communicating with said coolant supply header and with said coolant vent line to remove gas from said internal coolant flow path and from said fuel cell stack to said vent line through said internal coolant vent passageway.

11. The fuel cell system of claim 10, wherein said coolant system includes a coolant reservoir, said vent line communicates with said reservoir, and gas removed from said internal coolant flow path flows into said reservoir.

12. The fuel cell system of claim 11, wherein said coolant system includes a pump communicating with said reservoir and with said coolant supply line, and said pump creates a pressure differential between said reservoir and said coolant supply header.

13. The fuel cell system of claim 10, wherein said internal coolant vent passageway communicates with a nominal high point of said coolant supply header.

14. The fuel cell system of claim 10, wherein said first and seconds ones of said apertures are immediately adjacent.

15. The fuel cell system of claim 10, wherein a direction of fluid flow in said coolant supply header and in said internal coolant vent passageway are substantially opposite directions.

16. The fuel cell system of claim 10, wherein said fuel cell stack has first and second ends separate and distinct from said fuel cells and all of said coolant flow and said gas flow through a same end of said fuel cell stack.

17. The fuel cell system of claim 16, wherein said same end is a wet end and the other of said ends is a dry end.

18. The fuel cell system of claim 10, wherein said vent line has a valve therein that can be operated to selectively vent gas from said internal coolant flow path.

19. The fuel cell system of claim 10, wherein said internal coolant flow path includes a coolant supply header and a coolant return header, and said coolant vent line communicates with said coolant supply header.

* * * * *